US010344178B2

(12) United States Patent
Breidenstein et al.

(10) Patent No.: US 10,344,178 B2
(45) Date of Patent: Jul. 9, 2019

(54) POWDER CORROSION AND CHIP-RESISTANT COATING

(71) Applicant: Akzo Nobel Coatings International B.V., Arnhem (NL)

(72) Inventors: Jason Paul Breidenstein, Fleetwood, PA (US); Douglas S. Cinoman, Doulgassville, PA (US); Paul R. Horinka, Blandon, PA (US); Edward G. Nicholl, Reading, PA (US)

(73) Assignee: Akzo Nobel Coatings International B.V., Arnhem (NL)

( * ) Notice: Subject to any disclaimer, the term of this patent is extended or adjusted under 35 U.S.C. 154(b) by 110 days.

(21) Appl. No.: 13/904,059

(22) Filed: May 29, 2013

(65) Prior Publication Data
US 2013/0273364 A1    Oct. 17, 2013

Related U.S. Application Data

(62) Division of application No. 12/661,855, filed on Mar. 25, 2010.

(60) Provisional application No. 61/211,847, filed on Apr. 3, 2009.

(51) Int. Cl.
C09D 163/00 (2006.01)
C09D 5/03 (2006.01)
F16F 1/02 (2006.01)

(52) U.S. Cl.
CPC .......... C09D 163/00 (2013.01); C09D 5/038 (2013.01); F16F 1/024 (2013.01); Y10T 428/2925 (2015.01)

(58) Field of Classification Search
CPC ..................................... C08L 63/00
USPC ......................................... 428/371
See application file for complete search history.

(56) References Cited

U.S. PATENT DOCUMENTS

| | | | |
|---|---|---|---|
| 3,170,890 A | 2/1965 | Boyd et al. | |
| 3,245,925 A | 4/1966 | Watson | |
| 3,336,251 A | 8/1967 | Manasia | |
| 3,756,984 A | 9/1973 | Klaren et al. | |
| 3,769,069 A | 10/1973 | Sawyer | |
| 3,817,946 A | 6/1974 | Ree | |
| 3,860,557 A | 1/1975 | Millar et al. | |
| 3,874,883 A | 4/1975 | Robitaille et al. | |
| 3,884,705 A | 5/1975 | Blair | |
| 3,917,648 A * | 11/1975 | McLeod | 524/364 |
| 3,947,522 A | 3/1976 | Shelley et al. | |
| 4,098,740 A * | 7/1978 | Wallace | 524/517 |
| 4,186,036 A | 1/1980 | Elms et al. | |
| 4,237,037 A | 12/1980 | Takahashi | |
| 4,313,837 A | 2/1982 | Vukasovich et al. | |
| 4,316,939 A | 2/1982 | Guyomard | |
| 4,345,004 A | 8/1982 | Miyata et al. | |
| 4,381,334 A | 4/1983 | Balk et al. | |
| 4,491,554 A | 1/1985 | Hamel et al. | |
| 4,572,868 A | 2/1986 | Hosaka et al. | |
| 4,581,293 A | 4/1986 | Saunders | |
| 4,804,581 A | 2/1989 | Geary et al. | |
| 4,933,382 A | 6/1990 | Kitagawa et al. | |
| 5,030,285 A | 7/1991 | Vallvey et al. | |
| 5,062,284 A | 11/1991 | Kubo et al. | |
| 5,063,095 A | 11/1991 | Kitagawa et al. | |
| 5,091,242 A | 2/1992 | Chung | |
| 5,097,006 A | 3/1992 | Kapilow et al. | |
| 5,137,567 A | 8/1992 | Vallvey et al. | |
| 5,196,261 A | 3/1993 | Ono et al. | |
| 5,248,400 A | 9/1993 | Franks et al. | |
| 5,264,503 A | 11/1993 | Marx | |
| 5,274,006 A | 12/1993 | Kagoshima et al. | |
| 5,334,631 A | 8/1994 | Durand | |
| 5,338,347 A | 8/1994 | Rohr et al. | |
| 5,342,885 A | 8/1994 | St. Clair | |
| 5,461,112 A | 10/1995 | Masse et al. | |
| 5,468,461 A | 11/1995 | Hosoda et al. | |
| 5,562,989 A | 10/1996 | Statz | |
| 5,569,687 A | 10/1996 | Sanborn et al. | |
| 5,614,323 A | 3/1997 | Chang | |
| 5,677,367 A | 10/1997 | Savin | |
| 5,686,185 A | 11/1997 | Correll et al. | |
| 5,789,482 A | 8/1998 | Eldin et al. | |

(Continued)

FOREIGN PATENT DOCUMENTS

CA    1120253        3/1982
CN    1198690 A      11/1998
(Continued)

OTHER PUBLICATIONS

Bulletin of the American Physical Society, vol. 1, No. 3, pp. 122-123, Mar. 15-17, 1956.
Powder Coatings, vol. 184 "Elastomer-Modified Epoxy Powder Coatings: a Review," Apr. 13, 1994, No. 4347.
Polymer Reprints, vol. 3, No. 3, pp. 358-359 by H.-J Sue and E.I. Garcia-Melfin, The Division of Polymer Chemistry, Inc., American Chemical Society, Aug. 1991.
G.B. Rothenberg in Paint Additives Recent Developments, Noyes Data Corporation, 1978, pp. 175-177.
English Abstract of JP58168619A.
English Abstract of JP59193970A.
English Abstract of JP59029154A.
English Abstract of JP61148274.
(Continued)

Primary Examiner — Megan McCulley
(74) Attorney, Agent, or Firm — Pauly, DeVries Smith & Deffner, LLC

(57) ABSTRACT

A powder composition including a resin and from 5% to 70%, by weight based on powder composition weight, of a corrosion-inhibiting pigment, optionally including from 0% to 65%, by weight based on powder composition weight, zinc, the composition being substantially free from pigment providing a metallic effect is provided. The corrosion-inhibiting pigment may be present in amounts of up to 50%, by weight based on powder composition weight, for example, up to 35%. A method for coating a substrate with the powder composition and the coated substrate so formed are also provided.

8 Claims, No Drawings

(56) References Cited

U.S. PATENT DOCUMENTS

| | | | |
|---|---|---|---|
| 5,789,498 A | 8/1998 | Ohnishi et al. | |
| 5,981,086 A | 11/1999 | Siminski | |
| 6,022,927 A | 2/2000 | Decker et al. | |
| 6,025,438 A | 2/2000 | Hinterwaldner et al. | |
| 6,069,221 A | 5/2000 | Chasser et al. | |
| 6,184,311 B1 | 2/2001 | O'Keeffe et al. | |
| 6,254,751 B1 | 7/2001 | Reiter et al. | |
| 6,284,846 B1 | 9/2001 | Ambrose et al. | |
| 6,294,610 B1 | 9/2001 | Daly et al. | |
| 6,346,292 B1 | 2/2002 | Grubb et al. | |
| 6,403,222 B1 | 6/2002 | Harrison | |
| 6,521,706 B1 | 2/2003 | Desai et al. | |
| 6,537,610 B1 | 3/2003 | Springer et al. | |
| 6,663,968 B2 | 12/2003 | Grubb et al. | |
| 6,677,032 B1 | 1/2004 | Grubb et al. | |
| 6,770,702 B1 | 8/2004 | Muller et al. | |
| 7,018,716 B2 | 3/2006 | Grubb et al. | |
| 7,244,780 B1 | 7/2007 | Robinson et al. | |
| 7,473,717 B2 | 1/2009 | Muenz et al. | |
| 8,192,840 B2 | 6/2012 | Kunita et al. | |
| 2001/0002274 A1* | 5/2001 | Lessmeister | B05D 7/14 427/195 |
| 2001/0051227 A1* | 12/2001 | Jung | B05D 1/265 427/486 |
| 2002/0090823 A1* | 7/2002 | Grubb et al. | 438/699 |
| 2002/0142101 A1* | 10/2002 | Holzapfel | B05D 7/57 427/407.1 |
| 2002/0185199 A1* | 12/2002 | Myers et al. | 148/537 |
| 2003/0124248 A1 | 7/2003 | Tullos et al. | |
| 2004/0009300 A1 | 1/2004 | Shimakura et al. | |
| 2004/0101670 A1 | 5/2004 | Grubb et al. | |
| 2004/0266899 A1 | 12/2004 | Muenz et al. | |
| 2007/0116963 A1 | 5/2007 | Sakakibara | |
| 2007/0172665 A1 | 7/2007 | Kunita et al. | |
| 2007/0260003 A1* | 11/2007 | Cinoman et al. | 524/439 |
| 2008/0233300 A1* | 9/2008 | Cinoman et al. | 427/386 |
| 2009/0110934 A1 | 4/2009 | Cinoman et al. | |
| 2009/0176903 A1 | 7/2009 | Muenz et al. | |
| 2009/0270533 A1 | 10/2009 | Umehara et al. | |
| 2010/0255296 A1 | 10/2010 | Kunita et al. | |
| 2010/0256282 A1 | 10/2010 | Breidenstein et al. | |
| 2010/0297422 A1 | 11/2010 | Lucas | |
| 2012/0258316 A1 | 10/2012 | Lucas | |

FOREIGN PATENT DOCUMENTS

| | | |
|---|---|---|
| CN | 1687269 A | 10/2005 |
| CN | 101033364 A | 9/2007 |
| CN | 101952374 A | 1/2011 |
| DE | 3018765 A1 | 11/1981 |
| DE | 10020481 A1 | 10/2001 |
| EP | 0040243 | 11/1981 |
| EP | 0292771 B1 | 11/1988 |
| EP | 0440292 A3 | 8/1991 |
| EP | 0500009 A1 | 8/1992 |
| EP | 0525870 A1 | 2/1993 |
| EP | 0526153 A1 | 2/1993 |
| EP | 0631536 B1 | 1/1995 |
| EP | 0846710 A1 | 6/1998 |
| EP | 0882101 B1 | 12/1998 |
| EP | 0994141 A2 | 4/2000 |
| EP | 1165712 B1 | 1/2002 |
| EP | 1972672 A2 | 9/2004 |
| EP | 1726621 A1 | 11/2006 |
| GB | 1407851 | 9/1975 |
| GB | 1565379 | 4/1980 |
| JP | 49039625 | 4/1974 |
| JP | 58-114767 | 7/1983 |
| JP | 58114766 A | 7/1983 |
| JP | 58168619 A | 10/1983 |
| JP | 59029154 A | 2/1984 |
| JP | 59193970 A | 11/1984 |
| JP | 61148274 | 7/1986 |
| JP | 3000785 A | 1/1991 |
| JP | 3-170523 A | 7/1991 |
| JP | 6-9903 | 1/1994 |
| JP | 06329955 A | 11/1994 |
| JP | 7026119 A | 1/1995 |
| JP | 07-216297 | 8/1995 |
| JP | 8-10686 | 1/1996 |
| JP | 9012926 A | 1/1997 |
| JP | 09272820 | 10/1997 |
| JP | 11188309 A | 7/1999 |
| JP | 2000143938 A | 5/2000 |
| JP | 2000-176373 | 6/2000 |
| JP | 2000190422 | 7/2000 |
| JP | 2002105393 | 4/2002 |
| JP | 2003286435 | 10/2003 |
| JP | 2004-352994 | 12/2004 |
| JP | 2006096905 A | 4/2006 |
| JP | 2006096928 A | 4/2006 |
| JP | 4020557 | 10/2007 |
| JP | 2007-313475 | 12/2007 |
| JP | 2007-314712 | 12/2007 |
| JP | 2007314762 | 12/2007 |
| WO | WO91/14745 | 10/1991 |
| WO | WO92/11324 | 7/1992 |
| WO | WO93/17851 | 9/1993 |
| WO | WO00/55268 | 9/2000 |
| WO | WO2003/093375 A1 | 11/2003 |
| WO | WO2004/046245 A1 | 6/2004 |
| WO | WO2005/028580 A2 | 3/2005 |
| WO | WO2006/005136 A1 | 1/2006 |
| WO | WO2006/038491 A1 | 4/2006 |
| WO | 06/052725 A1 | 5/2006 |
| WO | WO2007/025007 A1 | 3/2007 |
| WO | WO2007/138396 A1 | 12/2007 |
| WO | WO2009/129088 A1 | 10/2009 |
| WO | WO2011/012627 A2 | 2/2011 |

OTHER PUBLICATIONS

English Abstract of JP2000143938A.
English Abstract of JP2000190422.
English Abstract of JP2002105393.
English Abstract of JP2003286435A.
English Abstract of JP2006096905A.
English Abstract of JP2006096928.
English Machine Translation of DE10020481.
English Machine Translation of DE3018765A1.
English Abstract of JP3170523A.
English Abstract of JP3000785A.
English Abstract of JP06329955-A.
English Abstract of JP7026119A.
English Abstract of JP9012926A.
English Abstract of JP09272820.
English Abstract of JP9039625.
Derwent English Abstract of JP58114766A.
English Abstract of JP2007314762.
English Abstract of JP4020557.
Polymer Science Dictionary, 2nd Ed., Mark Alger, Apr. 7, 1999, pp. 5-6.
Polymer Preprints, Vo. 32, No. 3, Aug. 1991, American Chemical Society, Aug. 12, 1991, pp. 358-359.
Encyclopedia of Polymer Science and Engineering, vol. 3, Cellular Materials to Composites, 1985, pp. 552, 575-577.
Encyclopedia of Polymer Science and Engineering, vol. 6, Emulsion Polymerization to Fibers, Manufacture, 1985, pp. 362-367.
Rubber Modified Powder Coating Resin, KR-102, Kukdo Chemical Co., Ltd. Jul. 10, 2000, pp. 1-3.
General Motors Engineering Standards, Materials and Processes-Procedures, Chip Resistance of Coating GM9508P, Jul. 1991, p. 1-8.
General Motors Engineering Standards, Materials and Processes-Procedures, Scab Corrosion Creepback of Elp Paint Systems on Metal Substrates, GM9511P, Oct. 1986, p. 1-2.
General Motors Engineering Standards, Materials and Processes-Procedures, Cass Test, Copper-Accelerated ACetic Acid Salt Spray Test (FOG), GM4476P, Nov. 1988, p. 1-5.

(56) References Cited

OTHER PUBLICATIONS

Polymer Wax and the Use Thereof in Powder Coatings, Zhong Jianghai, et al, pp. 1-5, Dec. 31, 2002.
Powder Coatings Foaming Agents, Dr. Tina Grubb, Computerized Literature Search, Jan. 7, 1997.
Elastomer-Modified Epoxy Powder Coatings: A Review, Ralph Drake, BF Goodrich Specialty Chemicals, Apr. 13, 1994, vol. 184, No. 4347, pp. 151-154.
Shell Chemicals Systems & Solutions Newsletter, Apollo and Resins & Versatics Join Forces, Jack Christenson, Jul. 2000, vol. 2, Issue 3, pp. 1-3.
Paint Additives Recent Developments, G.B. Rothenberg, Noyes Data Corporation, 1978, pp. 175-177.
Dow Epoxy Powder Coatings, Hardeners, Oct. 2001, pp. 1-6.
Bulletin of the American Physical Society, Programme of the 1956 Mar. Meeting at Pittsburgh, PA, No. 3, Mar. 15-17, 1956, pp. 122-123.
English Translation of Chinese Application No. 2008102131717 Office Action dated Jan. 31, 2011.
English Translation of Chinese Patent Application No. 2009801023012 Office Action, dated Jul. 24, 2012.
English Translation of Japanese Patent Application No. 2008-208848 Office Action dated Oct. 5, 2011.
European Patent Application No. 08003475.4 Search Report, dated Jun. 23, 2008.
International Patent Application No. PCT/EP2009/050738 Preliminary Report on Patentability dated Feb. 8, 2010.
International Patent Application No. PCT/EP2009/050738 Search Report and Written Opinion dated May 8, 2009.
International Patent Application No. PCT/EP2010/060907 Search Report dated Mar. 22, 2011.
English Abstract of JP07-216297.
English Abstract of JP58-114767.
English Abstract of JP2000-176373.
English Translation of Japanese Patent Application No. 2012-522155 Office Action dated Jul. 16, 2013.
English Translation of Mexico Patent Application No. MX/a/2008/013642 Office Action dated Mar. 19, 2013.
English Translation Translation of Chinese Patent Application No. 201080032749.4 Office Action dated Jul. 26, 2013.
QPatent Abstract for Chinese Patent Publication 101033364A.
QPatent Abstract for Japanese Patent Publication 06-009903A.
QPatent Abstract for Japanese Patent Publication 8-010686A.
QPatent Abstract for Japanese Patent Publication 2004-352994A.
European Search Report frin related EP Application No. 10160331.4 dated Oct. 6, 2010.
European Search Report from related EP Applicaton No. 08250931.6 dated Jul. 7, 2009.
European Search Report from related EP Application No. 10156454.0 dated Jul. 22, 2010.
European Examination Report dated Nov. 23, 2010 for related EP Application No. 10156454.0.
"The Role of Additives in Powder Coatings," Paint & Coatings Industry Magazine, Fall 1999, (http://www.pcimag.com/articles/the-role-of-additives-in-powder-coatings).
Restriction Requirement dated Feb. 24, 2012 in corresponding U.S. Appl. No. 12/661,855, filed Mar. 25, 2010, 8 pages.
Non-Final Office Action dated Apr. 27, 2012 in corresponding U.S. Appl. No. 12/661,855, filed Mar. 25, 2010, 5 pages.
Final Office Action dated Jul. 24, 2012 in corresponding U.S. Appl. No. 12/661,855, filed Mar. 25, 2010, 6 pages.
Advisory Action dated Nov. 5, 2012 in corresponding U.S. Appl. No. 12/661,855, filed Mar. 25, 2010, 5 pages.
Non-Final Office Action dated Jun. 6, 2013 in corresponding U.S. Appl. No. 12/661,855, filed Mar. 25, 2010, 5 pages.
Final Office Action dated Jan. 27, 2014 in corresponding U.S. Appl. No. 12/661,855, filed Mar. 25, 2010, 6 pages.
Advisory Action dated Apr. 7, 2014 in corresponding U.S. Appl. No. 12/661,855, filed Mar. 25, 2010, 6 pages.
Board of Appeal Decision dated Aug. 25, 2016 in corresponding U.S. Appl. No. 12/661,855, filed Mar. 25, 2010, 7 pages.
Non-Final Office Action dated Nov. 23, 2016 in corresponding U.S. Appl. No. 12/661,855, filed Mar. 25, 2010, 8 pages.

\* cited by examiner

POWDER CORROSION AND CHIP-RESISTANT COATING

The present application is a divisional application of U.S. patent application Ser. No. 12/661,855, filed Mar. 25, 2010, which claims the benefit of priority under 35 U.S.C. § 119(e) of U.S. Provisional Patent Application No. 61/211,847 filed on Apr. 3, 2009.

This invention relates to a powder composition suitable for powder coating. More particularly this invention relates to a powder composition including a resin and from 5% to 70%, by weight based on powder composition weight, of a corrosion-inhibiting pigment, the composition being substantially free from pigment providing a metallic effect. This invention also relates to a method for coating a substrate with the powder composition and a coated substrate.

U.S. Pat. No. 7,244,780 discloses powder coating compositions that comprise a film-forming polymer, a pigment such as aluminum flake providing a metallic effect and a stabilizing additive that inhibits degradation of the metallic pigment.

U.S. Pat. No. 7,018,718 discloses corrosion- and chip-resistant coatings for high tensile steel components, such as automotive coil springs, formed from a coating powder composition of "toughened" epoxy resin. In a single coat embodiment, the entire coating is loaded with at least 75 phr zinc powder. In a dual coat embodiment, an inner coat is loaded with at least 75 phr zinc and an outer, zinc-free coating is reinforced by the addition of fibers and/or by a foaming agent which renders it porous.

There has been a need for a powder composition suitable for coating a substrate, particularly a steel substrate such as, for example, high tensile steel wherein a coating formed from the composition exhibits a high level of chip resistance and corrosion resistance without relying on the use of high levels of zinc metal. The powder composition of the present invention is capable of exhibiting a high level of chip resistance and corrosion resistance without relying on the use of high levels of zinc metal.

In a first aspect of the present invention, there is provided a powder composition comprising a resin and from 5% to 70%, by weight based on powder composition weight, of a corrosion-inhibiting pigment, said composition being substantially free from pigment providing a metallic effect. The corrosion-inhibiting pigment may be present in amounts of up to 50%, by weight based on powder composition weight, or up to 40%, or up to 35%.

In a second aspect of the present invention there is provided a method for coating a substrate comprising: forming a powder composition comprising a resin and from 5% to 70%, by weight based on powder composition weight, of a corrosion-inhibiting pigment said composition being substantially free from pigment providing a metallic effect; applying said powder composition to a substrate; and heating said powder composition to fuse and cure said applied composition. The corrosion-inhibiting pigment may be used in amounts of up to 50%, by weight based on powder composition weight, or up to 40%, or up to 35%.

In a third aspect of the present invention there is provided a method for coating a substrate comprising: forming a first powder composition comprising a resin and from 0% to 70%, by weight based on powder composition weight, of a corrosion-inhibiting pigment, said first powder composition being substantially tee from pigment providing a metallic effect; applying said first powder composition to said substrate; forming a second powder composition comprising a resin and from 5% to 70%, by weight based on powder composition weight, of a corrosion-inhibiting pigment said composition being substantially free from pigment providing a metallic effect; applying said second powder composition to said substrate coated with said first powder composition; and heating said applied powder compositions to fuse and cure said compositions. In each of the first and second powder compositions, the corrosion-inhibiting pigment may be present in amounts of up to 50%, by weight based on powder composition weight, or up to 40%, or up to 35%.

In a fourth aspect of the present invention there is provided a coated substrate comprising said substrate bearing a coating comprising a resin and from 5% to 70%, by weight based on powder composition weight, of a corrosion-inhibiting pigment. The coating may comprise corrosion-inhibiting pigment in amounts of up to 50%, by weight based on powder composition weight, or up to 40%, or up to 35%.

The powder composition of the present invention includes at least one resin, i.e., a polymeric composition suitable for powder coatings such as, for example, thermoplastic or thermoset resins, particularly an epoxy resin. The epoxy resin may be chosen from a variety of epoxy resins useful for coating powders known in the art, such as those produced by the reaction of epichlorohydrin or polyglycidyl ether and an aromatic polyol such as bisphenol, e.g., bisphenol A. The epoxy resin typically has an epoxy functionality greater than 1.0 and more preferably greater than 1.9. Generally the epoxy equivalent weight should be at least 170, but lower values may be acceptable in some cases. Preferably the epoxy equivalent weight is less than 2300, and more preferably from 800 to 1500. Such epoxy resins may be produced, for example, by an etherification reaction between an aromatic or aliphatic polyol and epichlorohydrin or dichlorohydrin in the presence of an alkali such as caustic soda. The aromatic polyol may be, for example, bis(4-hydroxyphenyl)-2,2-propane (i.e. bisphenol A), bis(4-hydroxyphenyl)-1,1-ethane, bis(4-hydroxyphenyl)-1,1-isobutane, bis(4-hydroxy-t-butylphenyl)-2,2-propane, bis(2-hydroxynaphthyl)methane, 4,4'-dihydroxybenzophenone or 1,5-pentanediol, 1,6-hexanediol, diethylene glycol, methylene glycol, polyethylene glycol, polypropylene glycol or dipropylene glycol, for example diglycidyl ethers or condensed glycidyl ethers of such diols, can be used. Other oxirane group-containing polymers that can be used as the epoxy resin in hybrid powder coating compositions according to this invention include polyglycidyl-functional acrylic polymers or epoxy novolak resins. Preferred epoxy resins for use in the present invention are those based on bisphenol A.

The powder composition may further incorporate one or more of toughening, foaming, and reinforcing technologies. "Toughening technology" herein refers to modification of the resin component to provide a tougher applied coating. "Foaming technology" herein refers to powder compositions selected to engender foam structure in the applied coating. "Reinforcing technology" herein refers to additional components in the powder composition selected to reinforce the applied coating.

Epoxy resin may be toughened by the use of additives or co-reactants such as, for example, as impact modifiers, flexibilizing agents, plasticizers and tougheners. These may include:
   elastomeric modifications, either within the base polymer, reacted into the coating composition through cross-linking, or as unreacted additives, such as, for example, CTBN rubber, butadiene/styrene, nitrile, neoprene, acrylic, butyl, ethylene/propylene/diene, polysulfide, polyisoprene, silicone, and urethane rubber;

random or block copolymer addition which offer some degree of internal plastication and may be exemplified by the FORTEGA™ products (Dow Chemical Co.);

addition of plasticizers such as epoxidized soybean oil;

crosslinked or noncrosslinked core/shell resins with various compositions such as epoxy, acrylic, polyurethane representing either the core or the shell portion.

Further tougheners may include hollow spherical particle including polymeric or glass beads.

Discrete microdomains of any of the above may be present and may contribute to chip resistance.

In one embodiment the epoxy resin, preferably a bisphenol A resin, is adducted to an elastomer having a $T_g$ of −30° C. or below, preferably −40° C. or below. The preferred elastomer is CTBN rubber. Such epoxy/CTBN rubber adducts are described, for example, in U.K. Patent Specification 1,407,851 (C. G. Taylor) published Sep. 24, 1975 and Powder Coatings, 184 "Elastomer-Modified Epoxy Powder Coatings: a Review", Apr. 13, 1984, No. 4347. To provide the toughening (flexibilizing) for cold-temperature chip resistance, the CTBN component should be present at least 5 wt % of the total of the CTBN and the epoxy components. Above about 25 wt % CTBN, no further benefit is realized and it is not desired to exceed 25 wt % lest there be insufficient epoxy component for a good cure. The fact that the elastomer component is chemically bound to the epoxy component, i.e., by esterification reaction of the carboxyl groups of the CTBN with epoxy groups, ensures that a complete phase separation does not occur during fusion and curing of the coating powder. However, there are microdomains of epoxy and rubber.

In an alternative embodiment, a core/shell resin is used in which an acrylic rubber resin forms the core and the epoxy resin, preferably a bisphenol A epoxy resin, forms the shell. Again, chemical bonding between carboxylic functionality of the acrylic rubber resin of the core and the epoxy resin of the shell prevents phase separation during fusion and curing of the coating powder formed using the core/shell resin Such acrylic rubber modified epoxies are described, for example, in *Polymer Reprints,* 32(3), pp. 358-9 by H-J Sue and E. I. Garcia-Melfin.

In another embodiment thermosetting epoxy resins may include either a cross-linking agent, such as a polyhydroxyl compound or a cure catalyst to effect auto cross-linking of the epoxy resin. For example, the epoxy resin is cured with a polyhydroxyl functionality having a relatively high hydroxy equivalent weight, i.e., at least about 200 up to about 500, preferably at least about 300. The relatively high hydroxy equivalent weight of the cross-linking agent ensures relatively long chain length between OH groups, which chain lengths provide flexibility to the cured coating, helping to render the coatings chip-resistant. Suitable curing agents useful in the practice of this invention are exemplified by phenolic curing agents, such as a bisphenol A end capped diglycidyl ether of bisphenol A, which is the reaction product of a diglycidyl ether of bisphenol A and bisphenol A and polyester resins with free carboxylic acid groups that are known to form "Hybrid" powder coatings. Examples of preferred phenolic curing agents for the epoxy resin component include those sold under the trademarks D.E.H.™87 and D.E.H.™85 (Dow Chemical Co.), both of which are believed to be bisphenol A end capped diglycidyl ethers of bisphenol A. Other classes of phenolic hardeners can be used as well such as phenol- and cresol-novolac curing agents sold by Dow Chemical Co. Hexion Specialty Chemicals.

Other epoxy crosslinking agents include, for example:

amines, including multifunctional aliphatic or aromatic primary or secondary amines, such as dicyandiamide, diaminodiphenyl sulfone;

tertiary amines which promote self cross-linking such as DMP 30 (Dow Chemical Co.).;

boron trihalides and salts thereof such as the monoethanolamine salt of boron trifluoride;

Organic acid salts such as VESTAGON™B55 and VESTAGON™B88 (Degussa Corp.).;

di and poly anhydrides such as benzophenonetetracarboxylic dianhydride (BTDA);

di and poly phenols such as methylene disalicylic acid; and, imidazoles, substituted imidazoles and epoxy imidazole adducts such as 2-methyl imidazole or DEH 40 (Dow Chemical Co.).

The powder composition of the present invention is a resin-based composition that includes from 5% to 70%, by weight based on powder composition weight, of a corrosion-inhibiting pigment. The corrosion-inhibiting pigment may be, for example, at least one of:

simple molybdates such as zinc molybdate, strontium molybdate and complex molybdates such as calcium zinc molybdate, calcium zinc phosphomolybdate (eg., MOLYWHITE™ MZAP);

simple chromates such as zinc chromate, barium chromate, strontium Chromate, magnesium chromate, calcium chromate and complex chromates such as lead silico chromate, zinc tetraoxy chromate;

metal phosphides such as iron phosphide (e.g. FERROPHOS™ iron phosphide, OCCIDENTAL CHEMICAL CORP, Dallas, Tex.);

silicates such as zinc phosphosilicate and calcium borosilicate; and simple phosphates such as iron phosphate, zinc phosphate, zinc pyrophosphate, calcium hydrogen phosphate and complex phosphates such as zinc borate orthophosphate, strontium aluminum polyphosphate, zinc aluminum polyphosphate, zinc aluminum molybdenum orthophosphate, zinc aluminum orthophosphate.

The pigments may be present in their basic form, may be organic modified, and may be present as the hydrate. Other descriptions of suitable corrosion-inhibiting pigments appear in U.S. Pat. No. 3,884,705 and are summarized by G. B. Rothenberg in Paint Additives, Noyes Data Corp, 1978, pp 175-177. U.S. Pat. No. 7,244,780 also discloses corrosion-inhibiting pigments that include "a source of stabilizing anions, advantageously phosphate ions, capable of dissolving in the presence of water".

Zinc phosphate herein is contemplated to include (a) Zinc phosphate di- or tetra-hydrate, preferably in the form of spheroidal particles as described in U.S. Pat. No. 5,137,567 (an example of zinc phosphate dihydrate being the material available under the trade name DELAPHOS™ 2M and a further example of a zinc phosphate being the available under the trade name HISPAFOS™ SP, comprising spheric particles of narrow particle size distribution); (b) Spheroidal zinc phosphate as a crystalline phase in admixture with an amorphous phase composing Fe(II) phosphate and Fe(III) phosphate. Further information concerning such materials may be found in U.S. Pat. No. 5,030,285; and (c) Zinc phosphate (preferably in spheroidal form) modified with zinc molybdate (such as ACTIROX™106; Microfine Minerals Ltd.)

The powder composition optionally includes from 0% to 65%, by weight based on powder composition weight, zinc; typically the zinc is in powder or flake form. Preferably the powder composition includes a minimal amount of zinc; more preferably the powder composition is free from zinc.

The powder composition of the present invention is "substantially free from pigment providing a metallic effect", which means that the total proportion of metallic pigment(s) incorporated in the powder coating composition shall be less than 0.1% by weight (based on the weight of the composition without the metallic pigment(s)); preferably no metallic pigment is included in the powder composition. By "a pigment providing a metallic effect" herein is meant a metallic pigment typically in flake form such as, for example, aluminium or an aluminium alloy or another metal or alloy, for example, stainless steel copper, tin, bronze or brass typically used to produce various metallic effects including those referred to as "metallic", "effect", "lustre", or "glamour" finishes.

The metallic pigment may be an uncoated or coated material. Examples of coated materials include pigments coated with silica or another inert inorganic material for greater chemical resistance and durability. Alternatively, the pigment may be coated with a plastics material for similar purposes, for example, an acrylic, PTFE or thermosetting plastics material, or may be provided in a polymer or plasticizer which is compatible with the film-forming binder of the powder coating composition. As a further possibility, the metallic pigment may be coated with a coloring agent such as a metal oxide pigment such as, for example, iron oxide, to provide special color effects.

Powder compositions used to provide the chip-resistant and corrosion-resistant coatings of the present invention are produced in the usual manner. The components are blended, and then are melt-compounded with heating above the melting point of the resin for a short time, e.g., 30 to 90 sec., so that no significant curing occurs. The molten compound is extruded, and after extrusion, the composition is rapidly cooled. The composition is then ground and, as necessary, the particulates sorted according to size. For electrostatic coating, the particles are generally in the 5 to 100 micron size range with a major portion generally being in the 20 to 40 micron size range. Larger particulates are useful for fluidized bed coating operations.

In the method for coating a substrate of the present invention the powder composition of the present invention is applied to the substrate and heated to fuse and cure the applied composition. In one embodiment the substrate is a metal substrate, typically a steel substrate, wherein the powder composition may be may be used, for example, as a pipe coating, rebar coating, or a coating for agricultural or construction equipment. In another embodiment the substrate is a high tensile steel substrate such as is suitable for use, for example, in coil springs in the transportation industry. Herein, high tensile steel is defined as having MPa (megapascal ($N/m^2$) ranging from 1800 Mpa to 2100 Mpa or above; this includes super high tensile steel from 1950 Mpa to 2100 Mpa or above. Steel substrates herein are contemplated to include pretreated steel substrates, including treatments of, for example, zinc phosphate, iron phosphate, and dry in place pretreatment technology. The powder composition is typically heated at a temperature of greater than 149° C. (300° F.) for a time sufficient to fuse and substantially cure the coating such as, for example, by placing into an electric air circulating oven maintained at 160° C. (320° F.) for 20 minutes for a cured film thickness of 50 to 101 μm (2.0-4.0 mils). It is understood that thermoplastic resins do not include a cure mechanism and therefore will only fuse under healing.

In the method for coating a substrate of the present invention the powder composition may be applied as a single coat, with sufficient film thickness for chip resistance protection. In an alternative embodiment the powder composition may be applied as a single foamed coat, the foam having been engendered by the use of a separate foaming agent or by the temperature-dependent inherent foaming of certain phosphate and related constituents such as, for example, zinc phosphate. Optionally, the powder composition may incorporate reinforcing technology, that is, the composition may include carbon fibers, slip agents, barium sulfate, calcium carbonate, wollastonite, or any materials that will reinforce the coating to enhance chip resistance.

In an alternative method of the present invention a two coat method may be Employed. In such embodiments a first coat (base coat) is applied and the basecoat may be partially or fully cured. Then a subsequent second coat (top coat) is applied to the base coat and the coats are fused and cured. Either of the first coat, the second coat, or both first and second coats, independently, is formed from the powder composition of the present invention. Either of the first coat, the second coat, or both first and second coats may independently be foamed coats as described hereinabove. Either of the first coat, the second coat, or both first and second coats may independently include carbon fibers, slip agents, barium sulfate, calcium carbonate, wollastonite, or any materials that will reinforce the coating to enhance chip resistance.

The introduction of cellular foam structures is not limited to the organic portion of the protective system. For example, the steel cleaning and "pretreatment" or passivation step may introduce and or include foam forming components which generate a cellular structure within the pretreatment layer or the organic layer above it as evolved gases percolate through the film during heating. Examples of such gas generators are azo compounds, well known in the industry. Such foam may also be produced by simple decomposition or dehydration of the pretreatment chemicals themselves. Zinc phosphate (hopeite and/or phosphyllite), for example, having been deposited on cold rolled steel panels, has been shown to foam by heating to approximately 200° C.

The coated substrate of the present invention bears a coating including a resin and from 5% to 70%, by weight, based on powder composition weight, of a corrosion-inhibiting pigment, optionally further including from 0% to 65%, by weight based on powder composition weight, zinc, the composition being substantially free from pigment providing a metallic effect. It is formed by the above-described method of the present invention.

EXAMPLE 1. FORMATION OF POWDER COMPOSITIONS AND APPLICATION TO SUBSTRATES

TABLE 1.1A

Powder compositions

Zinc Phosphate-Containing Base Coat compositions

| | Example No. | | | | |
|---|---|---|---|---|---|
| | 1-1<br>5%<br>Zn3(PO4)2 | 1-2<br>10%<br>Zn3(PO4)2 | 1-3<br>20%<br>Zn3(PO4)2 | 1-4<br>30%<br>Zn3(PO4)2 | 2-1<br>44%<br>Zn3(PO4)2 |
| Epoxy resin A | 92 | 92 | 92 | 92 | 92 |
| Imidazole adduct B | 3 | 3 | 3 | 3 | 3 |
| Carbon black pigment | 3 | 3 | 3 | 3 | 3 |
| Hydroxy compound C | 20.8 | 20.8 | 20.8 | 20.8 | 20.8 |
| Epoxy resin D | 8 | 8 | 8 | 8 | 8 |
| Zinc Dust | 0 | 0 | 0 | 0 | 0 |
| Zinc Phosphate | 6.7 | 14.5 | 32 | 54 | 100 |
| Fumed silica | 0.30% | 0.30% | 0.30% | 0.30% | 0.30% |

Other Corrosion-Inhibiting Base Coat compositions

| | 3-1 | 3-2 | 3-3 | 3-4 | 3-5 |
|---|---|---|---|---|---|
| Epoxy resin A[1] | 92 | 92 | 92 | 92 | 92 |
| Imidazole adduct B[2] | 3 | 3 | 3 | 3 | 3 |
| Carbon black pigment | 3 | 3 | 3 | 3 | 3 |
| Hydroxy compound C[3] | 20.8 | 20.8 | 20.8 | 20.8 | 20.8 |
| Epoxy resin D[4] | 8 | 8 | 8 | 8 | 8 |
| Zinc Dust | 237.5 | 225 | 200 | 175 | 150 |
| Zinc Phosphate | 0 | 0 | 0 | 0 | 0 |
| FERROPHOS ™ | 12.5 | 25 | 50 | 75 | 100 |
| Strontium Zinc Phosphosilicate | 0 | 0 | 0 | 0 | 0 |
| Calcium Borosilicate | 0 | 0 | 0 | 0 | 0 |
| Fumed Silica | 0.30% | 0.30% | 0.30% | 0.30% | 0.30% |

[1]Diglycidyl ether of bisphenol A epoxy resin with a weight per epoxide between 935 and 1175.
[2]Imidazole adduct with a diglycidyl ether of bisphenol A epoxy resin.
[3]Bisphenol A end capped diglycidyl ether of bisphenol A with a hydroxyl equivalent weight between 370 and 400.
[4]Master Batch epoxy resin containing 90 wt % of a diglycidyl ether of bisphenol A epoxy resin with a weight per epoxide between 795 and 895 and 10 wt % of acrylic flow modifier.

TABLE 1.1B

Powder compositions

Zinc Phosphate-Containing Base Coat compositions

| | Example No. | | | | | |
|---|---|---|---|---|---|---|
| | 2-2<br>44%<br>Zn3(PO4)2 | 2-3 | 2-4 | 2-5 | 2-6 | Control |
| Epoxy resin A | 92 | 92 | 92 | 92 | 92 | 92 |
| Imidazole adduct B | 3 | 3 | 3 | 3 | 3 | 3 |
| Carbon black pigment | 3 | 3 | 3 | 3 | 3 | 3 |
| Hydroxy compound C | 20.8 | 20.8 | 20.8 | 20.8 | 20.8 | 20.8 |
| Epoxy resin D | 8 | 8 | 8 | 8 | 8 | 8 |
| Zinc Dust | 150 | 175 | 200 | 225 | 237 | 250 |

TABLE 1.1B-continued

| Powder compositions | | | | | | |
|---|---|---|---|---|---|---|
| Zinc Phosphate | 100 | 75 | 50 | 25 | 12.5 | 0 |
| Fumed silica | 0.30% | 0.30% | 0.30% | 0.30% | 0.30% | 0.30% |

| Other Corrosion-Inhibiting Base Coat compositions | | | | |
|---|---|---|---|---|
| | 4-1 | 4-2 | 4-3 | 4-4 |
| Epoxy resin A[1] | 92 | 92 | 92 | 92 |
| Imidazole adduct B[2] | 3 | 3 | 3 | 3 |
| Carbon black pigment | 3 | 3 | 3 | 3 |
| Hydroxy compound C[3] | 20.8 | 20.8 | 20.8 | 20.8 |
| Epoxy resin D[4] | 8 | 8 | 8 | 8 |
| Zinc Dust | 0 | 0 | 0 | 0 |
| Zinc Phosohste | 0 | 0 | 0 | 0 |
| FERROPHOS ™ | 0 | 0 | 0 | 0 |
| Strontium Zinc Phosphosilicate | 3.2 | 14 | 0 | 0 |
| Calcium Borosilicate | 0 | 0 | 6.7 | 22.4 |
| Fumed Silica | 0.30% | 0.30% | 0.30% | 0.30% |

[1]Diglycidyl ether of bisphenol A epoxy resin with a weight per epoxide between 935 and 1175.
[2]Imidazole adduct with a diglycidyl ether of bisphenol A epoxy resin.
[3]Bisphenol A end capped diglycidyl ether of bisphenol A with a hydroxyl equivalent weight between 370 and 400.
[4]Master Batch epoxy resin containing 90 wt % of a diglycidyl ether of bisphenol A epoxy resin with a weight per epoxide between 795 and 895 and 10 wt % of acrylic flow modifier.

Powder samples were electrostatically applied onto 7.68 cm×12.8 cm×0.082 cm (3 inch×5 inch×0.032 inch) steel panels. Panels were supplied by ACT Laboratories, Inc., B-958, P-60 (Zinc Phosphate/Non Chrome Rinse). Powder coated panels were placed into an electric air circulating oven maintained at 160° C. (320° F.) for 20 minutes. Cured film thickness was 50 to 101 μm (2.0-4.0 mils).

EXAMPLE 2: EVALUATION OF POWDER COATED PANELS

Each of the coated panels exhibited a direct/reverse impact rating of 1.84 kg·m (160 in-lb)/1.84 kg·m (160 in-lb).

The coated panels of Example 1 were scribed with an 'X' and placed in a Salt Fog Cabinet According to ASTM Method B 117. At intervals panels were removed from the cabinet and scraped with a dull knife, perpendicularly to scribed lines. Maximum undercutting (corrosion) was measured in inches outwardly from the scribe line. Panels were typically exposed for 3000 to 4000 hours.

As shown in Table 2.1, below, the powder composition-coated panels of the present invention. Examples 1-1, 1-2, 1-3, 1-4, and 2-1, exhibited a useful level of impact resistance and salt spray corrosion resistance.

TABLE 2.1

| Creepback from X-scribe during ASTM B 117 Salt Spray Exposure | | | | | | |
|---|---|---|---|---|---|---|
| | Example No. | | | | | |
| HOURS EXPOSED | Comparative 66% Zn Dust | 1-1 5% $Zn_3(PO_4)_2$ | 1-2 10% $Zn_3(PO_4)_2$ | 1-3 20% $Zn_3(PO_4)_2$ | 1-4 30% $Zn_3(PO_4)_2$ | 2-1 44% $Zn_3(PO_4)_2$ |
| 192 | NC | NC | NC | NC | NC | NC |
| 384 | NC | NC | NC | NC | NC | NC |
| 552 | NC | NC | NC | NC | NC | NC |
| 672 | NC | NC | NC | NC | NC | NC |
| 840 | NC | NC | NC | NC | NC | NC |
| 1008 | NC | <1/32" | <1/32" | <1/32" | <1/32' | <1/32" |
| 1176 | NC | NC | <1/32" | <1/32" | <1/32' | NC |
| 1344 | NC | <1/32" | <1/32" | <1/32" | <1/32' | <1/32" |
| 1512 | NC | <1/32" | <1/32" | <1/32" | <1/32' | <1/32" |
| 1680 | <1/32" | <1/32" | <1/32" | <1/32" | <1/32' | <1/32" |
| 1848 | <1/32" | <1/32" | 1/32" | 1/32" | <1/32' | <1/32" |
| 2016 | <1/32" | 1/32" | 1/32" | 1/32" | 1/32" | 1/32" |
| 2184 | <1/32" | 1/32" | 1/32" | 1/32" | <1/32' | <1/32" |
| 2352 | <1/32" | 1/32" | 1/32" | 1/32" | 1/32' | <1/32" |
| 2520 | <1/32" | >1/32" | 1/16" | 1/32" | >1/32' | <1/32" |
| 2688 | <1/32" | 1/16" | 1/16" | 1/16" | 1/16' | 1/32" |
| 2856 | <1/32" | 1/16" | >1/16" | 1/16" | 1/16' | 1/16" |
| 3024 | <1/32" | 1/16" | 3/32" | 3/32" | 3/32' | 1/16" |
| 3192 | <1/32" | 1/16" | 3/32" | 3/32" | 3/32' | 1/16" |
| 3360 | 1/32" | 3/32" | 1/8" | >3/32" | 3/32' | 1/16" |
| 3528 | 1/32" | 3/32" | 1/8" | 1/8" | 3/32' | 1/16" |

TABLE 2.1-continued

Creepback from X-scribe during ASTM B 117 Salt Spray Exposure

| | Example No. | | | | | |
|---|---|---|---|---|---|---|
| HOURS EXPOSED | Comparative 66% Zn Dust | 1-1 5% Zn3(PO4)2 | 1-2 10% Zn3(PO4)2 | 1-3 20% Zn3(PO4)2 | 1-4 30% Zn3(PO4)2 | 2-1 44% Zn3(PO4)2 |
| 3696 | 1/32" | 3/32" | 1/8" | 1/8" | 3/32" | 1/16" |
| 3864 | 1/32" | 1/8" | 3/16" | 1/8" | 1/8" | 1/16" |
| 4056 | 1/16" | 1/8" | >1/4" | 3/16" | 3/16" | 3/32" |

We claim:

1. A high tensile steel substrate coated with a corrosion resistant coating formed from a powder composition fused onto the substrate, the powder composition comprising an epoxy resin based on bisphenol A, a polyhydroxyl functional phenolic curing agent having a HEW of about 200 to about 500, and from 10% to 44% by weight based on powder composition weight of at least one corrosion-inhibiting pigment selected from the group consisting of molybdates, chromates, metal phosphides, silicates and zinc phosphate, wherein
   the powder composition is substantially free from pigment providing a metallic effect,
   the powder composition comprises zinc in an amount of 0% to 65% by weight based on the powder composition, and
   the powder composition is fused directly on the steel substrate or on the steel substrate pre-treated with zinc phosphate, iron phosphate, or dry-in-place pretreatment.

2. The steel substrate according to claim 1, wherein the powder composition further comprises at least one technology selected from the group consisting of a toughening technology, a foaming technology, or a reinforcing technology.

3. The steel substrate according to claim 2 wherein the toughening technology is selected from the group consisting of an elastomeric modifier, a random or block copolymer additive, a plasticizer, a crosslinked or non-crosslinked core/shell resin, and hollow spherical particles.

4. The steel substrate according to claim 3 wherein the toughening technology is a random or block copolymer additive.

5. The steel substrate according to claim 1 wherein the epoxy resin has an epoxy equivalent weight of less than 2300.

6. The steel substrate according to claim 1 wherein the epoxy resin is adducted to an elastomer.

7. The steel substrate according to claim 1 wherein the substrate is a steel coil spring.

8. The steel substrate according to claim 1, wherein the substrate contains no zinc.

* * * * *